June 10, 1924.
H. M. RIDGE
1,497,664
REGENERATIVE FURNACE
Filed Nov. 3, 1923
3 Sheets—Sheet 2
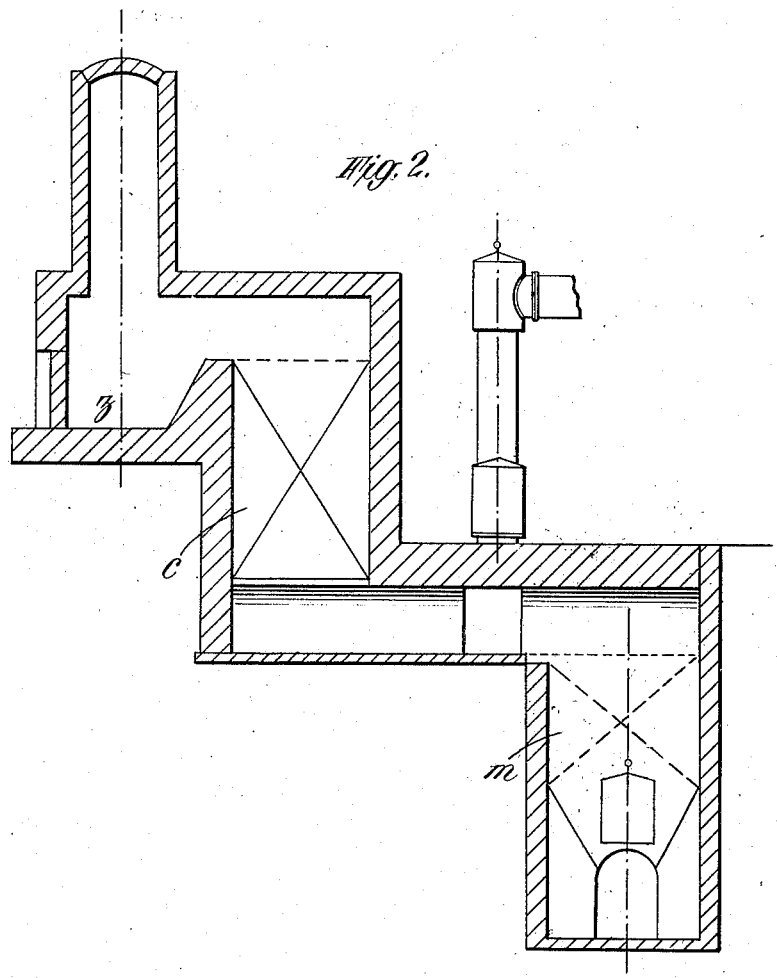

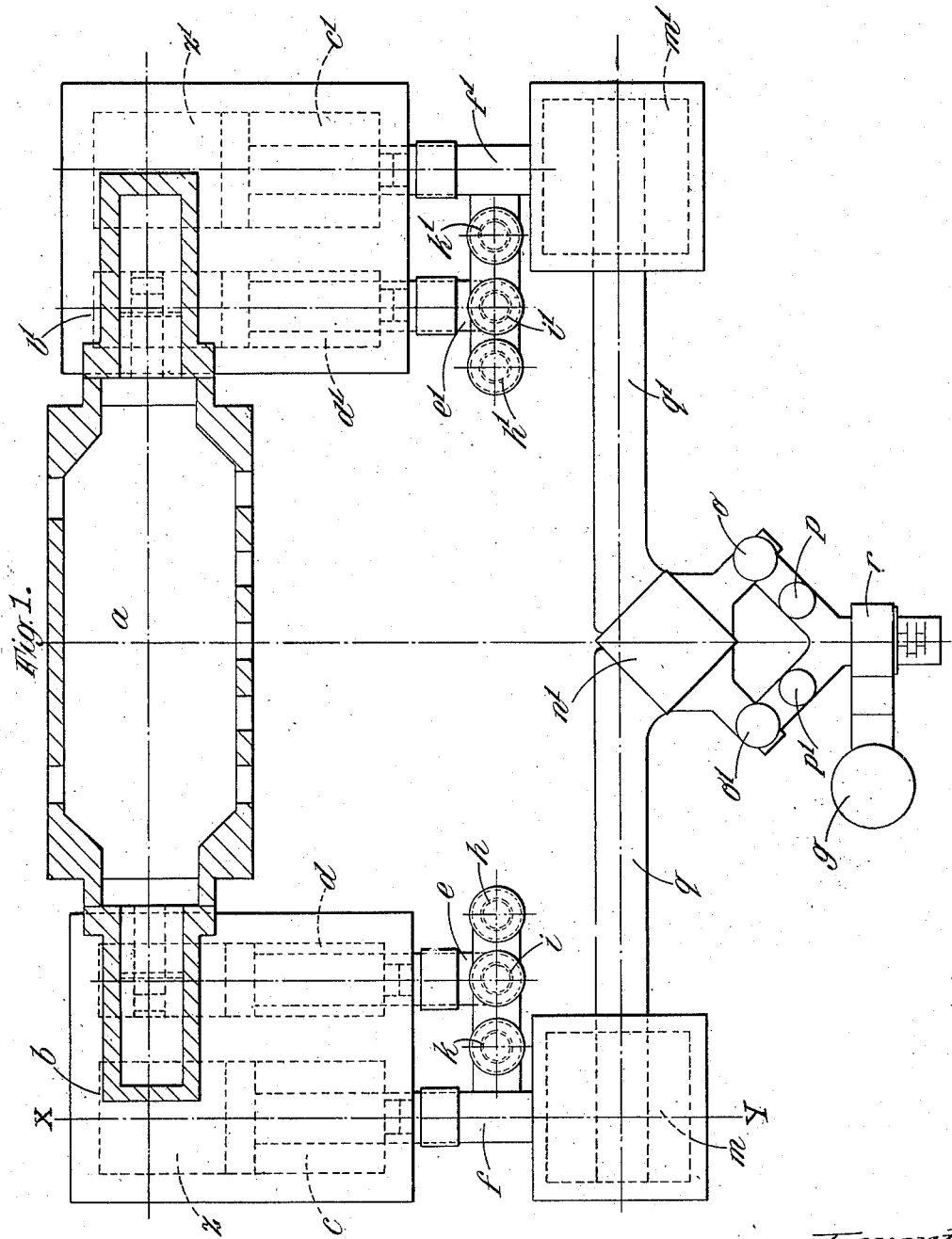

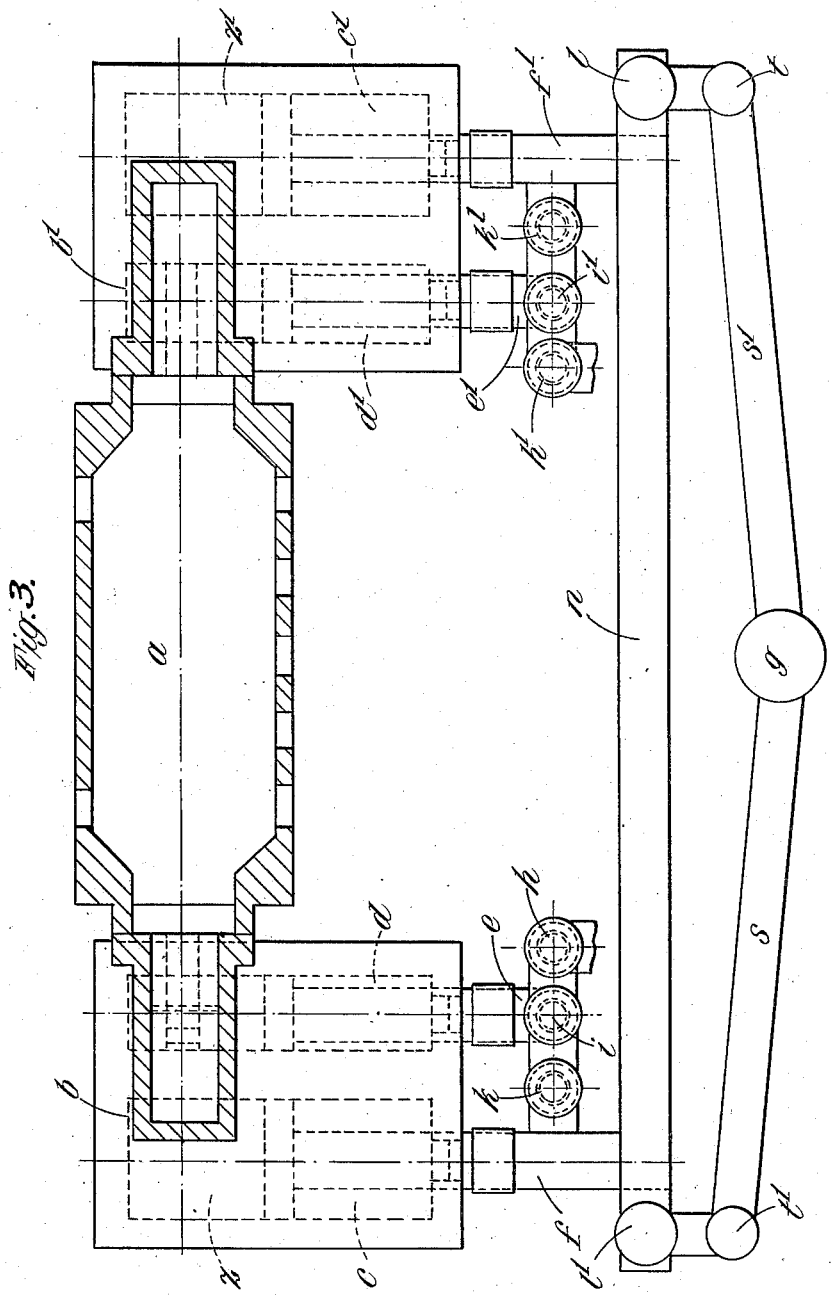

Patented June 10, 1924.

1,497,664

UNITED STATES PATENT OFFICE.

HARRY MACKENZIE RIDGE, OF LONDON, ENGLAND.

REGENERATIVE FURNACE.

Application filed November 3, 1923. Serial No. 672,636.

*To all whom it may concern:*

Be it known that I, HARRY MACKENZIE RIDGE, a subject of the King of Great Britain, residing in London, England, have invented certain new and useful Improvements Relating to Regenerative Furnaces, of which the following is a specification.

My invention relates to reversible regenerative furnaces and more particularly to those of the type having, in addition to the usual or primary regenerators with their air and gas or like chambers, additional or secondary regenerators for preheating air for the furnace, which additional regenerators are adapted to be traversed in turn by the waste gases from the chambers of the primary regenerators on their way to the chimney, whereby preheated air passing to the primary regenerators is first preheated by waste gases that have traversed the additional regenerators, the temperature of the waste gases being thereby reduced to an economically low degree.

The invention consists in an improved construction to reduce further than has been hitherto possible the heat loss in the waste gases. To this end the waste gases on leaving an additional regenerator are led through a counter-current recuperator, as hereinafter explained. By means of such arrangement air for the furnace passed through the recuperator becomes preheated before entering a regenerator.

The invention is applicable to a reverberatory furnace and to any other type of furnace including retort furnaces, muffle furnaces, and the like, and independently of their method of heating, so that oil firings, coal dust firing or other suitable methods may be used. It will be further described with reference to the accompanying diagrammatic drawings, in which:—

Fig. 1 is a plan view, partly in section, of a furnace plant comprising two sets of normal regenerators, one at either end and associated each with a single additional or secondary regenerator and combined with a counterflow recuperator.

Fig. 2 is a section on the line X Y in Fig. 1.

Fig. 3 is a plan view, partly in section, of a furnace plant in combination with a recuperator, the furnace being devoid of a secondary regenerator.

In the several figures corresponding parts are denoted by the same letters.

In the drawings, $a$ is a regenerative furnace with two normal regenerators $b$ and $b^1$ each of which has an air chamber $c$ and $c^1$, with air mains or flues $f$ and $f^1$ and a gas chamber $d$ and $d^1$ with the gas mains or flues $e$ and $e^1$, connecting valves $k$ and $k^1$, reversing valves $i$ and $i^1$, and gas valves $h$ and $h^1$. Slag pockets are shown at $z$, $z^1$.

Fig. 1 shows a gas fired regenerative furnace with additional or secondary preheating regenerators $m$ and $m^1$. For more completely recovering the heat from the waste gas, there is provided a counter-current recuperator $n^1$ which is connected to the additional regenerators $m$, $m^1$ by flues $q$, $q^1$ respectively. On the flues which extend between the recuperator and the chimney $g$ are air admission valves $o$, $o^1$, and chimney dampers $p$, $p^1$. The chimney damper $p$ being closed, air is admitted at $o$ and passing through the recuperator $n^1$ and flue $q$ is thus preheated before entering the additional preheating regenerator $m$. From the regenerator $m$ the air passes through the conduit or flue $f$ and the air chamber $c$ of the regenerator $b$. At the same time the connecting valve $k$ being closed, gas is admitted through the main gas valve $h$, the reversing valve $i$, the flue or main $e$, the gas chamber $d$. The heated air and heated gas are conducted through the usual uptakes to the furnace, and hence to the regenerator $b^1$ and in parallel through the chequer work of the gas chamber $d^1$ and the air chamber $c^1$ to the flues $e^1$ and $f^1$; the main gas valve $h^1$ being closed and the reversing valve $i^1$ and the connecting valve $k^1$ being open the waste gas from the gas chamber $d^1$ passes into the flue $f^1$ and unites with the waste gas from the air chamber $d^1$. Thus the whole of the waste gas from chambers $c^1$ and $d^1$ enters the preheating regenerator $m^1$ and, after giving off its heat to the chequer work, is comparatively cool. After leaving the regenerator $m^1$ the waste gases pass through the flue $q^1$, the recuperator $n^1$, and the chimney valve $p^1$ to the chimney stack $g$. The temperature of the waste gases may, by this means, be so reduced that they become too dense and heavy to cause enough chimney draft, in which case a fan $r$ or other suitable means may be employed to obtain the requisite draft. After reversing, the chimney damper $p^1$ is closed, air is admitted at the valve $o^1$, the connecting valve $k^1$ is closed, the main gas valve $h^1$ is opened and also the reversing valve $i^1$, while the main gas valve $h$ and the air inlet at $o$ are closed, the connecting valve $k$ and the chimney valve $p$ being open.

The preheating regenerator $m$ may be placed at any convenient level, but preferably close to the regenerator $b$. The illustration in Fig. 2 shows the preheating regenerator $m$ at a lower level than the regenerator $b$ and this is particularly advantageous because the greater difference in height between the air inlet valve and the furnace air port causes increased draft so that if desired the air and gas may be drawn through the furnace at a high velocity, and this arrangement also causes increased suction at the waste gas ports of the furnace.

The spacing of the chequer work in the preheating regenerator $m$ can be made closer than in the regenerator $b$, so that the transference of heat from waste gas to the chequer work and from the checker work to the air is facilitated; the spacing of the chequer work in the regenerator $b$ must be comparatively large in order to prevent excessive accumulation of slag and dust, but after these have been deposited on the chequer work or in the flue $f$ such deposition is not to be feared in the preheating regenerator $m$, and it is therefore possible to design and build the chequer work of the latter in such a way as to obtain the best heat transference.

The recuperator may be built in various ways but in each case the same passages are used alternately for the waste gas and the air. Where the capacity of the preheating regenerators $m$ and $m^1$ is sufficiently large to lower sufficiently the temperature of the waste gas, the recuperator may be made partly or wholly of metal which has the advantage of being a good conductor of heat.

Fig. 3 shows an arrangement by which the waste gas from the gas chamber unites with that from the air chamber and is then passed through a recuperator. With the chimney damper $t$ closed air is admitted at $l$ and travels through one set of passages in the recuperator $n$, the flue $f$ and the air chamber $c$ (the connecting valve $k$ being closed) to the furnace, while gas is admitted through the main gas valve $h$ and the reversing valve $i$, the flue $e$ and the gas chamber $d$ to the furnace; at the same time the gas leaves the furnace and passes through the regenerator $b^1$, thence through the gas chamber $d^1$, and, the main gas valve $h^1$ being closed, through the reversing valve $i^1$, the connecting valve $k^1$ thereby uniting in the flue $f^1$ with the gases which have passed through the air chamber $c^1$; these gases then travel through the second set of passages of the recuperator $n$ (the air inlet valve $l^1$ being closed) to the chimney valve $t^1$ and hence through the flue $s$ to the chimney $g$.

On reversing, the travel of the gases is in the opposite direction, air inlet $l^1$, chimney valve $t$ and flue $s^1$ being used.

Having thus described the nature of my said invention and the best means I know of carrying same into practical effect, I claim:—

1. In a reversible regenerative furnace, the combination of a furnace chamber, a regenerator at each end of said furnace, each regenerator comprising an air heating chamber and a gas heating chamber, a chimney stack, a counter current recuperator having two sets of passages therethrough, separate flues connecting respectively the air and gas heating chambers of one regenerator with one set of the recuperator passages and the air and gas heating chambers of the other regenerator with the other set of recuperator passages, said flues permitting simultaneously and alternately the flow of waste gases from one of the regenerators through one of the said sets of passages to the chimney stack and of atmospheric air to the other regenerator through the other of the said sets of passages, and means for passing simultaneously and alternately the said air through one of the said sets of passages in a direction opposite to the previous flow of waste gases therethough and the waste gases to the chimney through the other of the said sets of passages.

2. In a reversible regenerative furnace, the combination of a furnace chamber, a pair of primary regenerators one at each end of the furnace chamber, each primary regenerator comprising an air heating chamber and a gas heating chamber, a pair of secondary regenerators, means comprising conduits connecting the air and gas heating chambers of one primary regenerator with one of the secondary regenerators, and the air and gas heating chambers of the other primary regenerator with the other secondary regenerator, a chimney stack, a counter current recuperator having two sets of passages therethrough, a flue connecting one of the secondary regenerators with one of the said sets of passages, and a flue connecting the other secondary regenerator with the other set of passages, said flues permitting simultaneously and alternately the flow of waste gases from one of the secondary regenerators through one of the said sets of passages to the chimney stack and of atmospheric air to the other regenerator through the other of the said sets of passages, and means for passing simultaneously and alternately the said air through one of the said sets of passages in a direction opposite to the previous flow of waste gases therethrough and the waste gases to the chimney through the other of the said sets of passages.

In testimony whereof I have signed my name to this specification.

HARRY MACKENZIE RIDGE.